Jan. 19, 1932.                M. WILDERMAN                1,841,998
ELECTRIC ACCUMULATOR
Filed Oct. 31, 1929
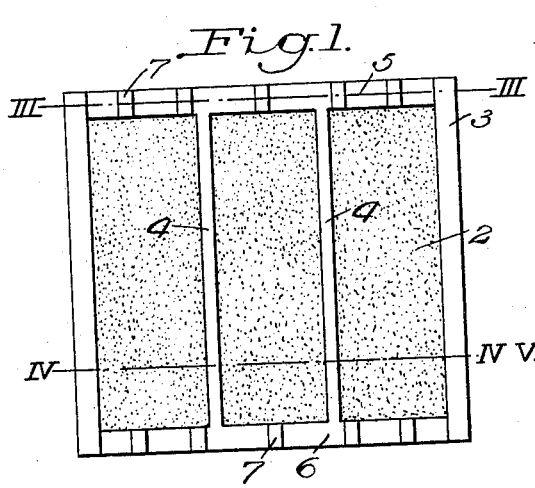
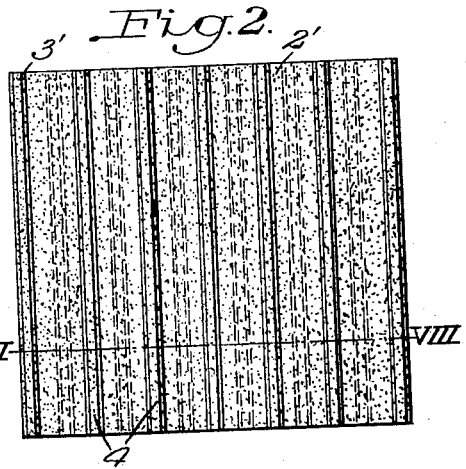
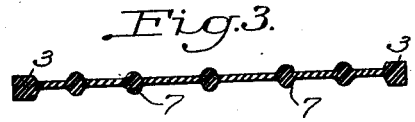
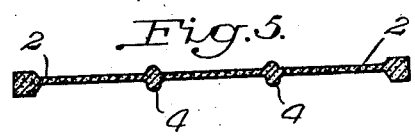
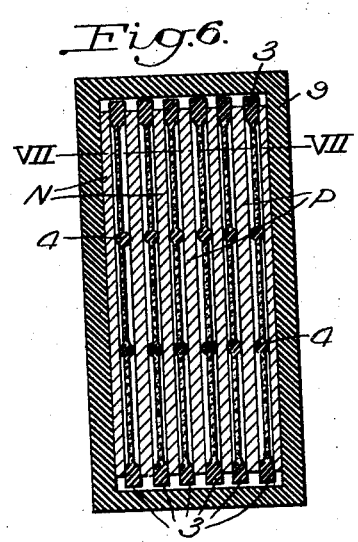
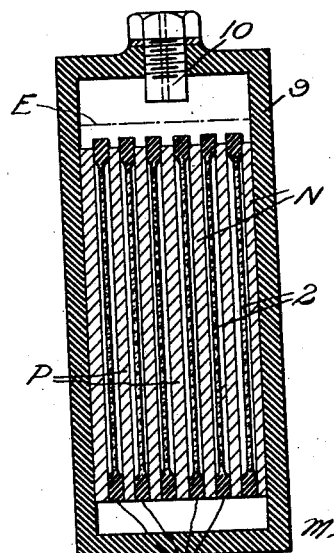
INVENTOR Patented Jan. 19, 1932

1,841,998

UNITED STATES PATENT OFFICE

MEYER WILDERMAN, OF LONDON, ENGLAND, ASSIGNOR TO THE AMERICAN WILDERMAN POROUS EBONITE COMPANY, INC., OF PHILADELPHIA, PENNSYLVANIA, A CORPORATION OF PENNSYLVANIA

ELECTRIC ACCUMULATOR

Application filed October 31, 1929. Serial No. 403,898.

This invention relates to an electric accumulator and provides material improvements in the efficiency and utility thereof.

This application is a continuation in part of my application Serial No. 745,637, filed October 24, 1924.

The usual electric accumulator comprises spaced electrodes immersed in a solution of sulphuric acid. All chemical reactions in the accumulator take place at the surface of contact between the sulphuric acid and the solid sponge lead and lead peroxide, as well as with the solid $SO_4Pb$ which separates on the electrodes. During discharge of the battery the acid becomes more dilute and during charge becomes more concentrated. The acid which is on the surface of contact is the first to take part in the reaction so that during charge or discharge there is a condition of non-uniform acid density existing in the cell.

During discharge the more concentrated acid between the electrodes is supplied by diffusion to the more dilute acid at the surface of contact with the electrodes, and in the pores of the active material. In charging, the reverse condition exists, the more concentrated acid lying adjacent the electrodes and in the pores of the active material. Diffusion is relatively a slow process and it cannot supply or remove the $H_2SO_4$ to or from the electrodes with the same speed as it is removed by the current from the solution, or is increased in the same at the surface of the electrodes and within the pores of the active material. As a result of this, the voltage, and with it the ampere-hour and watthour capacity drop considerably on account of the drop of acid concentration at the electrodes during discharge, this drop being the greater the higher the current of discharge.

During charging the rate of diffusion again regulates the rate of transportation of the $H_2SO_4$ from the acid within the pores and the surface of the electrodes to the acid layer therebetween so long as no gassing takes place in the cell. At 2.3 volts the cell begins to gas, separating hydrogen and oxygen which effectively stir the acid solution between the diaphragm and the electrodes making the density of the solution uniform. The circulation set up by gassing does not extend also to the acid within the pores of the active material, but since the acid is mixed up to the surfaces of the electrodes the diffusion of the acid from the pores into the rest of the solution is quicker the acid having to travel shorter distances.

Thus an improvement in all the important factors upon which the usefulness of the accumulator depends, including its speed of recuperation, can only be obtained, if the speed with which the sulphuric acid of the total acid solution in the battery is brought to the surfaces of the electrodes is made to be greater than it is under the action of diffusion.

This I achieve by the introduction of automatic circulation of the solution between the electrodes under the action of charge and discharge.

I provide means whereby the hydrostatic and electro-osmotic pressures are employed for producing effective and automatic circulation and mixing of the electrolyte between the electrodes so as to prevent the setting up of the conditions above described. To this end I employ a diaphragm having a rate of percolation materially greater than the wooden separators or threaded rubber separators now employed. I preferably employ a separator made of porous ebonite. These separators may be readily manufactured and their properties may be very accurately controlled. Their process of manufacture is fully set forth in my Patent No. 1,651,567 for process of manufacturing porous bodies, diaphragms, filters and the like of ebonite, dated December 6th, 1927.

In order to fully enjoy the advantages of my invention a number of conditions must be complied with, as follows:—

*a* A diaphragm must be used as a separator in order that hydrostatic and electro-osmotic pressures are created between the electrodes. This condition is not obtained by perforated sheets since no electro-osmotic pressure exists between the electrodes when they are used.

*b* The concentration of the electrolyte on the different sides of the diaphragm must be maintained of a different strength during charge and discharge as otherwise no hydrostatic pressure is obtainable, and the electro-osmotic pressure is materially diminished. In order to maintain this difference in concentration of electrolyte I so position the diaphragm that a greater quantity of electrolyte lies on one side of the plate than on the other. Preferably the diaphragm is placed so that it is closer to the negative electrode than to the positive electrode, since the drop of voltage at the positive electrode with the same drop of concentration in the electrolyte is much greater than the drop of the voltage at the negative electrode. The positioning of the separator nearer the negative than the positive electrode therefore gives rise to optimum conditions in the cell.

c Since the spaces between the separator and the electrodes are very small, usually one millimeter or less, the separators must be so constructed and be of such properties that the proper positioning of the diaphragm is maintained throughout the life of the battery. For this reason I provide the separators or diaphragms with a non-compressible frame or ribs capable of effectively counteracting the bending and buckling of the electrodes, the frame or ribs and the diaphrgm at the same time remaining unaffected by the electrode or by the gases evolved in the battery.

d While the separator should be placed closer to the negative than to the positive electrode, it is desirable to leave a free space at the negative side of the diaphragm between the diaphragm and the negative electrode so as to permit of circulation of the solution between the diaphragm and the electrode.

e The diaphragm must have a very high rate of percolation in order that the small values of the hydrostatic pressure and of the electro-osmotic pressure is sufficient for producing the desired results.

The speed of percolation of a porous diaphragm depends upon the porosity and upon the radius of the capillarities in the diaphragm and only a great porosity and a sufficient radius of the capillaries makes it possible to secure the desired speeds of percolation. By making separators as described in my patent above referred to, it is possible to secure diaphragms having remarkably high rates of percolation. For example, careful investigations extending over long periods and made with numerous samples, have shown that the speed of percolation through an ebonite diaphragm made of a powder of grain 0.9 millimeters and of about 50% porosity is from 40,000 to 100,000 times as great as that of wooden diaphragms of the same thickness, about 8000 times as great as that of the earthenware diaphragms used in Leclanché cells and about 1000 times as great as that of threaded rubber after the latter have been in water or solution for a few days.

The above was established by direct measurements of the speed of percolation by the method of P. A. Guye, Journal de Chimie et de Physique, Vol. II, page 79 (1904).

With a treated wooden separator 0.9 millimeter thick, about 20 cm$^2$ surface, 0.14 cm$^3$ passed per minute under the pressure of a column of solution 107 cm high, i. e. 0.000007 cm$^3$ solution passed per cm$^2$ of separator per minute and 1 mm pressure of solution.

With porous ebonite separators of the same dimensions 0.35 to 0.7 cm$^3$ of solution passed per cm$^2$ of the diaphragm per minute and 1 mm pressure of the solution.

The last can also be much simpler illustrated by bringing a drop of water on a porous ebonite separator; it passes instantaneously to the other side also when the thickness of the drop became 0.1 mm or even less.

The thickness of the separators being usually about 0.9 or 1 mm the above data give also the exact amounts of solution which must pass the diaphragm, when it is placed between the electrodes and an overpressure of 1 mm water alone exists, for one reason or another, from one side of the diaphragm to the other. If the distance between the diaphragm and the electrode be 1 mm the total amount of solution per centimeter square of the diaphragm between the electrode and the separator is 0.1 cm$^3$, that is, the solution between the separator and the electrode has been renovated 3, 5 to 7 times per minute, and if this distance is only 0.4 mm the solution between the diaphragm and the electrode has been renovated 9 to 18 times per minute. The pressure on the solution in any given capillary of the diaphragm being greater at the one end of the capillary than at the other, the same is bound to move in the capillary from the side of greater pressure to the side of the smaller pressure. According to the elementary laws of hydrostatics the total pressure on the solution in any such capillary of the diaphragm is at each end equal to the section of the capillary multiplied by the height of the column of the solution from the capillary to the top surface of the solution in the cell multiplied by the average specific gravity of this column. If therefore for one reason or another the specific gravities or the concentration of the solution is on both sides of the diaphragm different such a movement of the solution through the diaphragm is inevitable however the cell may be constructed, whether the separators and the electrodes are closed up in the cell or not, the amount of solution passing through the diaphragm depending besides the overpressure upon the speed of percolation of the diaphragm. It is very great in case of a porous ebonite separator, and extremely small or practically zero for all practical purposes in case of a wooden separator.

In the porous separator of great percolation the solution moving through the diaphragm is doing this at the total surface of the electrode, not on one or two places of the electrode alone; and the distance between the two electrodes, as well as between the separator and the electrodes, being very small a very small movement of the solution is sufficient to bring it mechanically up to the surfaces of the electrodes themselves. It is for this reason that I designate this as circulation of the electrolyte between the electrodes, extending its activity up to the surfaces of the electrodes themselves where it is most needed.

To create such a difference of the concentration on both sides of the diaphragm in an automatic manner I place the diaphragm between the electrodes in such a manner that more solution is between the diaphragm and one of the electrodes than between the same and the other. The object being to keep the concentration of the thicker layer of solution between the diaphragm and the electrode higher, when during discharge the same number of molecules of sulphuric acid disappear at each electrode.

If the separator is so placed between the electrodes that the amount of solution on each side of the separator is the same, the concentration of the solution during discharge will be on each side of it also the same and there will be no, or practically no, movement of the solution through the diaphragm, also when its speed of percolation is otherwise great. Similarly if the separator is placed with the one side straight on one of the electrodes (say the negative), so that no free space between the separator and the electrode is left, the circulation is mechanically prevented because the requisite free space for movement of the solution is not provided for. For this reason the separator must be so placed between the electrodes that there should be free space between the separator and each of them.

In a cell of a 60 A. H. capacity, having 11 electrodes and 10 separators of say 13 cm x 15 cm, the total surface of the separator is about 2000 cm² and the total surface of the capillaries of the separators having a 50% porosity through which the solution is pressed is about 1000 cm², which for a separator of great speed of percolation is enormous.

In the accompanying drawings given by way of example to illustrate the present invention, Figure 1 is a plan view of one form of separator, Figure 2 is a plan view of a slightly modified form of separator, Figure 3 is a cross section of the frame of the separator on line III—III, if the frame is made of a nonporous substance such as ebonite, Figure 4 is the cross section of the separator on line IV—IV, when the frame and the vertical strips are made of a nonporous substance such as nonporous ebonite, while the diaphragm consists of a porous substance such as porous ebonite, Figure 5 gives the cross section of the same separator on the same line IV—IV of the frame, the vertical strips also consist of a porous substance such as porous ebonite.

Figure 6 is a horizontal section of a cell showing the arrangements of the electrodes and the separators between so placed as to give more solution at the positive electrodes than at the negative electrodes, Figure 7 is a vertical section of the same battery viewed from the narrow side of the battery on the line VII—VII of Figure 6, Figure 8 gives a cross section of a separator Fig. 2 made wholly of a porous substance such as porous ebonite containing two vertical strips at the ends and small vertical strips between at each side of the separator.

Referring to the drawings, the separator illustrated in Figures 1, 3, 4, 6 and 7 comprises a web portion 2 of say porous ebonite which is completely surrounded by a frame 3 of nonporous ebonite. The web 2 is provided with spaced ribs 4 which contact with adjacent electrodes to maintain the separator spaced therefrom the web 2 being more removed from one electrode (in this case from the positive electrode) than from the other (in this case the negative electrode), the front surfaces of the frame and of the ribs being removed from the web more on one side than on the other (see cross section Figures 3, 4, as well as Figures 6 and 7). The top portion 5 and the bottom portion 6 of the frame 3 are provided with projections 7 which allow the gas to escape during charge of the cell.

Figure 5 shows the same Figure 4 if the separator is wholly made of porous ebonite, the front surfaces of the frame and of its projections 7 in the top and bottom portion and the vertical ribs 4 being more removed from the surface of the web 2 on one side than on the other.

In the modified form of separator shown in Figure 2 and Figure 8, the wide ribs 3' and the narrow ribs 4' as well as the web 2' are made of a porous substance such as ebonite. The ribs 4' and the vertical ribs 3' extending beyond the plane of the web on both sides, more on the one side than on the other, the separators being used with the electrodes in the battery and arranged in the same manner as illustrated in Figures 6 and 7. In this case the separator is shown to contain also ribs 8 between the ribs 4' on one side of the separator.

The separators are arranged in a container 9 as illustrated in Figures 6 and 7. The frames 3 and the vertical ribs contacting with the adjacent electrodes prevent distortion of the electrodes which have a tendency to warp or buckle, especially at high rates of discharge. In Figure 7 the level of the electrolyte is indicated by the line E—E. The cell is provided with a vent plug 10 which allows the gases developed in the cell to escape.

In the embodiment shown in Figures 1, 3, 4, 5, 6, and 7 the frame 3 extends completely around the separator.

It should be understood that the present invention is not restricted to the forms of separator given by way of illustration here, nor to the kind of material used for the porous separator, as long as the porous separator is of a great speed of percolation and the separator when used in connection with the electrodes in the battery is removed from the active material of the one electrode more than from that of the other.

I claim:

1. In an electric accumulator having spaced electrodes adapted to be submerged in an electrolyte, a porous diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte.

2. In an electric accumulator having spaced electrodes adapted to be submerged in an electrolyte, a porous ebonite diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte.

3. In an electric accumulator having spaced electrodes adapted to be submerged in an electrolyte, a porous diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the diaphragm having ribs which project beyond the web more on one of its sides than on the other.

4. In an electric accumulator having spaced electrodes adapted to be submerged in an electrolyte, a porous ebonite diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the diaphragm having ribs which project beyond the web more on one of its sides than on the other.

5. In an electric accumulator having spaced electrodes adapted to be submerged in an electrolyte, a porous diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the web being surrounded by a frame which is thicker than the web and projects beyond the surface of the web on both sides, the projection on one side being greater than on the other.

6. In an electric accumulator having spaced electrodes adapted to be submerged in an electrolyte, a porous ebonite diaphragm having a web, the diaphragm being of great speed of percolation, lying between the electrodes and acting as a separator, the diaphragm contacting with the adjacent electrodes, the web of the diaphragm being more removed from one electrode than from the other one and forming unequal free spaces on each side of the web for free circulation of the electrolyte, the web being surrounded by a frame which is thicker than the web and projects beyond the surface of the web on both sides, the projection on one side being greater than on the other.

7. In an electric accumulator having spaced electrodes adapted to be submerged in an electrolyte, a porous diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the web being surrounded by a frame which is thicker than the web and projects beyond the surface of the web on both sides, the projection on one side being greater than on the other, and other ribs within the frame and of the same thickness as the frame.

8. In an electric accumulator having spaced electrodes adapted to be submerged in an electrolyte, a porous ebonite diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the web being surrounded by a frame which is thicker than the web and projects beyond the surface of the web on both sides, the projection on one side being greater than on the other, and other ribs within the frame and of the same thickness as the frame.

9. In an electric accumulator having spaced electrodes adapted to be submerged in an electrolyte, a porous diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the diaphragm having non-porous ribs projecting beyond the surface of the web on both sides, the projection on one side being greater than on the other.

10. In an electric accumulator having spaced electrodes adapted to be submerged in an electrolyte, a porous ebonite diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the diaphragm having ribs of non-porous ebonite projecting beyond the surface of the web on both sides, the projection on one side being greater than on the other.

11. In an electric accumulator having spaced electrodes adapted to be submerged in an electrolyte, a porous diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the web being surrounded by a frame which is thicker than the web and projects beyond the surface of the web on both sides, the projection on one side being greater than on the other, at least one of the horizontal portions of the frame being provided with channels for the escape of gas.

12. In an electric accumulator having spaced electrodes adapted to be submerged in an electrolyte, a porous ebonite diaphragm having a web, the diaphragm being of great speed of percolation, lying between the electrodes and acting as a separator, the diaphragm contacting with the adjacent electrodes, the web of the diaphragm being more removed from one electrode than from the other and forming unequal free spaces on each side of the web for free circulation of the electrolyte, the web being surrounded by a frame which is thicker than the web and projects beyond the surface of the web on both sides, the projection on one side being greater than on the other, at least one of the horizontal portions of the frame being provided with channels for the escape of gas.

In testimony whereof I have hereunto set my hand.

MEYER WILDERMAN.